United States Patent [19]

Dodson

[11] 4,192,788

[45] Mar. 11, 1980

[54] MODIFIED POLYETHYLENE CONTAINING HOT-MELT ADHESIVES USEFUL FOR CARPET TAPE

[75] Inventor: Daniel P. Dodson, Longview, Tex.

[73] Assignee: Eastman Kodak Company, Rochester, N.Y.

[21] Appl. No.: 928,330

[22] Filed: Jul. 26, 1978

[51] Int. Cl.$^2$ .................. C08L 93/00; C08L 23/26
[52] U.S. Cl. .................. 260/27 R; 260/45.75 W; 260/45.85 A; 260/45.85 P; 260/45.85 S; 525/166
[58] Field of Search .............. 260/27 R, 885, 878 R, 260/878 B

[56] References Cited

U.S. PATENT DOCUMENTS

| | | |
|---|---|---|
| 3,437,629 | 4/1969 | Von Bramer et al. ....... 260/33.6 UA |
| 3,468,978 | 9/1969 | Battersby ..................... 260/27 R |
| 3,485,783 | 12/1969 | Kehe ........................... 260/27 R |
| 3,600,347 | 8/1971 | Godar .......................... 260/27 R |
| 3,615,106 | 10/1971 | Flanagan et al. ............ 260/27 R |
| 3,701,760 | 10/1972 | Hagemeyer, Jr. et al. ...... 526/19 |
| 3,856,889 | 12/1974 | McConnell .................. 260/897 B |
| 4,127,619 | 11/1978 | Godfrey ....................... 260/27 R |
| 4,140,733 | 2/1979 | Meyer et al. ................. 260/27 R |

FOREIGN PATENT DOCUMENTS 723201  12/1965  Canada ................................. 260/27 R

OTHER PUBLICATIONS

Bakelite Co-Mer EA Resin DPD-6169 Data Sheet, Union Carbide Corp., (New York), Dec. 1964.

*Primary Examiner*—H. S. Cockeram
*Attorney, Agent, or Firm*—Clyde L. Tootle; Daniel B. Reece, III

[57] ABSTRACT

The hot-melt adhesives of the present invention comprise a blend of at least one modified polyethylene resin, an ethylene/lower alkyl acrylate copolymer and a tackifying resin. This hot-melt adhesive has a novel combination of properties including excellent elevated and low temperature properties in combination with good low temperature flexibility, and provides excellent adhesion to nonporous substrates such as latex backed carpet.

12 Claims, No Drawings

MODIFIED POLYETHYLENE CONTAINING HOT-MELT ADHESIVES USEFUL FOR CARPET TAPE

This invention relates to modified polyethylene containing hot-melt adhesives. One aspect of this invention concerns a modified polyethylene containing hot melt adhesive having a novel combination of properties. Another aspect of this invention concerns a modified polyethylene containing hot-melt adhesive that has good elevated and low temperature properties including good low temperature flexibility and aging properties and excellent adhesion to latex backed carpet surfaces.

Hot-melt adhesives are widely used in industry for various applications such as in product assembly. For example, one such application is in the bonding of nonporous substrates, such as latex backed carpet. Previously, to obtain satisfactory bonding for such nonporous substrates it was necessary to use an ethylene vinyl acetate based hot-melt adhesive. However, ethylene vinyl acetate based adhesives have poor elevated temperature properties. The ethylene vinyl acetate based adhesives have the disadvantage that at elevated temperature they decompose easily. Moreover, it was not possible to modify the ethylene vinyl acetate based adhesives with polyolefins to improve the elevated temperature properties as the blends were incompatible. Therefore, it would be an advance in the state of the art to provide a polyethylene based hot-melt adhesive useful for bonding nonporous substrates and having excellent elevated and low temperature properties, in combination with good low temperature flexibility.

It is, therefore, an object of the present invention to provide a novel hot melt adhesive.

Another object of this invention is to provide a hot-melt adhesive that is capable of bonding nonporous latex backed carpet.

A further object of the present invention is to provide a modified polyethylene containing hot melt adhesive which can be used in rapid bonding of nonporous latex backed carpet substrates.

Another and further object of this invention is to provide an adhesive having good adhesion properties which can be applied without the use of a solvent.

In accordance with the present invention I have found that a blend comprising at least one modified polyethylene resin, an ethylene/lower alkyl acrylate copolymer and a tackifying resin provides a hot-melt adhesive which can be applied without solvents and has a novel combination of properties including excellent bonding to latex backed carpet substrates, good bond aging properties and excellent low and elevated temperature properties in combination with good low temperature flexibility.

The modified polyethylene has a saponification number of about 3 to 10, preferably 3–5, and is prepared by reacting polyethylene with an unsaturated polycarboxylic acid, anhydride or ester thereof by processes also well known in the art, as for example, U.S. Pat. No. 3,856,889. The polyethylene reacted with this unsaturated component can be low molecular weight or degraded polyethylene. The modified polyethylene can be used alone as the polyethylene component or blends of such modified polyethylene with unmodified polyethylene or blends or modified polyethylene and blends of more than one unmodified polyethylene can also be used.

The ethylene/lower alkyl acrylate copolymer suitable in this invention is, for example, an ethylene/ethyl acrylate copolymer having a melt index of 2 to 30, preferably 6 to 20, a density of 0.915 to 0.95 and an ethyl acrylate content of 10 to 25 percent by weight, preferably 18 percent to 23 percent by weight. A typical material may be purchased under the trade name of Bakelite CoMer EA Resin DPD-6169, marketed by the Union Carbide Company. Such useful ethylene/ethyl acrylate copolymers include materials prepared by the copolymerization of ethylene and ethyl acrylate at pressures of approximately 15,000 psi., and temperatures between 150° and 250° C. in the presence of a suitable catalyst. Other suitable ethylene/lower alkyl acrylates are ethylene/butyl acrylates and the like.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like DAC-B is Debutanized Aromatic Concentrate-B. One such suitable hydrocarbon tackifying resin is a hydrocarbon resin having a softening point of 130° C. and available commercially as Eastman Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 75° to 150° C.; an acid number of from about 0 to 2; a saponification value of less than about 1; and an iodine value of from about 75–100. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the rosin ester resins and the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process.

The hydrocarbon resins and polyterpene tackifying resins can be used either alone or in combination. These tackifying resins can be used in amounts of about 5 percent to about 30 percent by weight of the adhesive compositions, preferably about 15 to 30 percent by weight, most preferably 20 percent by weight. The modified polyethylene or a blend of such modified polyethylenes can be used in amounts of 55 to 90 percent by weight in the adhesive formulation, preferably 60 to 70 percent by weight, most preferably 65 percent by weight. The ethylene/lower alkyl acrylate copolymer can be used in an amount of 5 to 25 percent by weight, preferably 15 to 25 percent by weight, most preferably 15 percent by weight.

The adhesives of the present invention have a particular combination of properties including good bond strength to carpet substrates, good elevated temperature properties, good bond integrity and flexibility. The components of the adhesive within the above ranges provide an adhesive which has the desired properties. If the amounts of the components are modified from these ranges, the desirable combination of properties of the adhesive are affected. If the base modified polyethylene is used in an amount greater than 90 percent, the adhesive properties of the adhesive to a nonporous substrate are lowered. Likewise, if less than 5 percent tackifier is used the adhesion properties to nonporous substrates are lowered. If less than 5 percent ethylene/ethyl acrylate is used the integrity of the bond strength is decreased. More than 25 percent ethylene/ethyl acrylate increases the viscosity so that the adhesive can not be used in present adhesive applicators.

The adhesive compositions of this invention are prepared by blending together the adhesive components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles Dissolver provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 percent to about 1.5 percent by weight, preferably about 0.25 percent to 1.0 percent by weight, of one or more antioxidants. Antioxidants that are effective include, for example, tris(di-ti-butyl-p-hydroxybenzyl)-trimethylbenzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene-3-(3',5'-di-t-butyl-4-hydroxyphenyl)-propionate]-methane (Irganox 1010), lauryl stearyl thiodipropionate (Plastanox 1212), and dilauryl 3,3'-thiodipropionate (Plastanox DLTDP sold by American Cyanamid) and 2,6-di-tert-butyl-p-cresol (BHT) and the like.

Additives such as nucleating agents, pigments, colorants, fillers, solvents, and the like can also be added to the adhesive compositions of the present invention.

The adhesive compositions of this invention, which are essentially 100 percent solids, have a melt viscosity in the range of 5,000 to 30,000 centipoise at 375° F., preferably 10,000 to 15,000 centipoise, most preferably 12,000 centipoise.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 64.5 weight percent of low-molecular weight modified polyethylene (160.6 g.) having a saponification number of 5, a melt viscosity of 10,000 cp. at 150° C., density of 0.906 g./cc., and ring and ball softening point of 105° C.; about 7.5 weight percent of ethylene/ethyl acrylate copolymer (18.7 g.) containing 19 weight percent ethyl acrylate and a melt index of 6; about 28 weight percent of Eastman resin H-130 hydrocarbon resin tackifier (70 g.) having a density of 1.028 g./cc. at 70° F., melt viscosity of about 1000 cp. at 190° C., and ring and ball softening point of 129° C.; and 0.6 gram of tetrakis]methylene-3-(3',5'-di-t-butyl-4-hydroxyphenyl)propionate]methane are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive is applied in the form of a thin film or beads to carpet tape. The carpet tape on activation can be applied to the latex backing of two pieces of carpet by applying pressure to the carpet. Bonds made with this adhesive exhibit excellent adhesion to latex backed carpet and excellent elevated temperature performance.

EXAMPLE 2

Low-molecular weight modified polyethylene (180 g.) having a saponification number of 5, a melt viscosity of 10,000 cp. at 150° C., density of 0.906 g./cc., and ring and ball softening point of 105° C.; 70 grams of Eastman Resin H-130 hydrocarbon resin tackifier having a density of 1.028 g./cc. at 70° F., melt viscosity of about 1000 cp. at 190° C., and ring and ball softening point of 129° C.; and 0.6 gram of tetrakis[methylene-3-(3',5'-di-t-butyl-4-hydroxyphenyl)propionate]methane are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive is applied as a thin film to carpet tape and latex backed carpet bonded together by reactivating the adhesive. Bonds made with this adhesive exhibit poor shear strength.

EXAMPLE 3

Adhesive compositions were prepared using the three components of Example 1 in various percentages and the adhesion bond strength in grams was determined for these adhesives for the Mylar/Mylar bond strength. The composition and bond strength of these adhesives are shown in Table I.

Table I

| Adhesive | Modified Polyethylene, % | Ethylene/ Ethyl Acrylate, % | Resin H-130, % | Mylar/ Mylar Bond Strength, Grams |
| --- | --- | --- | --- | --- |
| Run 1 | 64.5 | 7.5 | 28.0 | 579 |
| Run 2 | 84.0 | 7.5 | 8.5 | 500 |
| Run 3 | 69.0 | 22.5 | 8.5 | 515 |
| Run 4 | 67.5 | 15.0 | 17.5 | 625 |

EXAMPLE 4

Adhesive compositions were prepared according to Example 3 using unmodified polyethylene in place of the modified polyethylene used in Example 4. The composition and bond strengths of these adhesives are shown in Table II.

Table II

| Adhesive | Unmodified Polyethylene, % | Ethylene/ Ethyl Acrylate, % | Resin H-130, % | Mylar/ Mylar Bond Strength, Grams |
| --- | --- | --- | --- | --- |
| Run 5 | 64.5 | 7.5 | 28.0 | NS[1] |
| Run 6 | 84.0 | 7.5 | 8.5 | NS |
| Run 7 | 69.0 | 22.5 | 8.5 | NS |
| Run 8 | 67.5 | 15.0 | 17.5 | 230 |

[1]NS indicates no seal as film strips are easily pulled apart.

The hot-melt adhesives comprising a blend of at least one modified polyethylene resin, an ethyene/ethyl acrylate copolymer, and a tackifying resin, provide adhesives having a unique combination of properties for bonding carpeting to substrates and having excellent adhesive properties. These adhesives provide excellent bond strengths when applied over a broad range of substrates.

The invention has been described in detail with particular reference to certain preferred embodiments thereof, but it will be understood that variations and modifications can be effected within the spirit and scope of the invention.

I claim:

1. An adhesive composition capable of being used as a hot melt adhesive comprising a blend of
    (a) about 55 to 90 percent by weight of at least one modified polyethylene,
    (b) about 5 to 25 percent by weight of at least one ethylene-lower alkyl acrylate copolymer, and
    (c) about 5 to 30 percent by weight of at least one tackifier resin selected from the group consisting of hydrocarbon resin, polyterpene resin and rosin ester resin.

2. An adhesive composition according to claim 1 wherein said modified polyethylene has a saponification number of about 3 to 10.

3. An adhesive composition according to claim 2 wherein said ethylene-lower alkyl acrylate has a melt index of 2 to 30, a density of 0.915 to 0.95, and an ethyl acrylate content of 10 to 25 percent by weight.

4. An adhesive composition according to claim 3 wherein said hydrocarbon tackifier resin is DAC-B hydrocarbon resin.

5. An adhesive composition capable of being used as a hot melt adhesive comprising a blend of
    (a) about 60 to 70 weight percent of at least one modified polyethylene,
    (b) about 15 to 25 weight percent of at least one ethylene-ethyl acrylate copolymer, and
    (c) about 15 to 30 weight percent of at least one tackifier selected from the group consisting of hydrocarbon resin, polyterpene resin, or rosin ester resin.

6. An adhesive composition according to claim 5 wherein said modified polyethylene has a saponification number of about 3 to 10.

7. An adhesive composition according to claim 6 wherein said ethylene-lower alkyl acrylate has a melt index of 2 to 30, a density of 0.915 to 0.95, and an ethylene acrylate content of 10 to 25 percent by weight.

8. An adhesive composition according to claim 7 wherein said hydrocarbon tackifier resin is DAC-B hydrocarbon resin.

9. An adhesive composition capable of being used as a hot melt adhesive comprising a blend of
    (a) about 65 percent by weight of at least one modified polyethylene,
    (b) about 15 percent by weight of at least one ethylene-lower alkyl acrylate copolymer, and
    (c) about 20 percent by weight of at least one tackifier resin selected from the group consisting of hydrocarbon resin, polyterpene resin and rosin ester resin.

10. An adhesive composition according to claim 9 wherein said modified polyethylene has a saponfication number of about 3 to 5.

11. An adhesive composition according to claim 10 wherein said ethylene-lower alkyl acrylate has a melt index of 6 to 20, a density of 0.915 to 0.95, and an ethyl acrylate content of 18 to 23 percent by weight.

12. An adhesive composition according to claim 11 wherein said hydrocarbon tackifier resin is DAC-B hydrocarbon resin.

* * * * *